United States Patent [19]

Cunard

[11] 4,211,401
[45] Jul. 8, 1980

[54] SWING HAVING ELECTRICALLY REWOUND SPRING MOTOR DRIVE

[75] Inventor: Joel C. Cunard, Bedford, Pa.
[73] Assignee: Hedstrom Co., Bedford, Pa.
[21] Appl. No.: 960,053
[22] Filed: Nov. 13, 1978
[51] Int. Cl.² ............................ A63G 9/16; F03G 1/08
[52] U.S. Cl. .......................................... 272/86; 5/109; 185/40 B
[58] Field of Search ............................. 272/86; 5/109; 185/40 B

[56] References Cited
U.S. PATENT DOCUMENTS

| 4,131,842 | 12/1978 | Smith | 185/40 B X |
| 4,150,820 | 4/1979 | Bochmann | 272/86 |

*Primary Examiner*—Anton O. Oechsle
*Attorney, Agent, or Firm*—Cesari and McKenna

[57] ABSTRACT

A child's electric swing includes a pre-wound wind-up mechanical escapement type motor having spring-biased retainer and driving pawls, the latter being connected to a pivotally mounted hanger supporting the swing seat. The pawls engage a mainspring-driven ratchet wheel which periodically impulses the driving pawl to maintain the seat in oscillation. The mainspring is rewound periodically by rotating the ratchet wheel in the opposite direction by a battery-operated motor through a gravity-operated one-way clutch after the ratchet wheel rotates only about 180° so that the pre-wound spring is always under tension. Also the pawls are moved out of engagement with the wheel during such rewinding to eliminate noise and drag on the wheel.

23 Claims, 8 Drawing Figures

SWING HAVING ELECTRICALLY REWOUND SPRING MOTOR DRIVE

This invention relates to a child's swing. It relates more particularly to a swing of that type which is electrically driven by a battery or other convenient DC source.

BACKGROUND OF THE INVENTION

Children's and infant's swings have, of course, been available for many years. The usual swing includes a child-supporting seat suspended by hangers whose upper ends are pivotally mounted to a frame structure that rests on the floor. Some prior swings of this type are also motorized, being driven by a wind-up spring motor having a clock-type escapement with the suspended child-supporting seat functioning as a pendulum. It has also been proposed to drive swings of this type electrically from a rechargeable battery pack. Such attempts have usually involved periodically electrically rewinding the spring of the spring motor as is done, for example, with automobile clocks.

However, those attempts have not resulted in a highly marketable product for a variety of reasons. First and foremost, the running time of the prior battery-operated swings from a single battery charge is too short, the best being about 45 minutes. Also, some prior swings are unable to maintain the child-supporting seat in oscillation over the weight range of the children likely to use the swings, which range runs from about 10 lbs. to 25 lbs. That is, while some swings may operate properly when occupied by infants at the lower end of that range, they do not swing heavier children for any appreciable length of time. Actually, the weight range should run from 0 lbs. on up because it is highly desirable for the swing to be able to operate properly with no occupant so that the swing can be displayed dynamically on the showroom floor. Such a display is very effective from a merchandising standpoint.

Further, some prior swings tend to stop if the swing is not level or if the moment arm of the swing changes appreciable due to a child's squirming or shifting his weight in the seat.

Also, some prior electrically driven swings of this general type tend to be quite expensive because in order to operate for even a tolerable length of time, they require relatively large battery packs to drive relatively complex spring motor escapement mechanisms comprised of many parts, all of which increase the parts and assembly costs of those swings. Their complexity also makes them prone to failure so that their operating lives are not as long as they should be. All of the aforesaid problems have militated against the prior battery operated swings being widely accepted in the marketplace.

SUMMARY OF THE INVENTION

Accordingly, it is an object of the present invention to provide an electric swing for an infant or child which can operate uninterruptedly for an unusually long time on a single battery charge.

Another object of the invention is to provide a swing of this type which requires only a single, standard, small voltage, rechargeable battery.

Still another object of the invention is to provide such a swing whose operation is relatively unaffected if the occupant of the swing suddenly shifts his weight or squirms about in the seat.

Another object is to provide such a swing which operates properly even when it is not level.

Yet another object of the invention is to provide a child's battery operated swing which can handle seat weights of from 0 to 25 lbs. with no adjustments having to be made to the swing structure.

A further object of the invention is to provide a removable self-contained battery operated motor unit which can serve selectively as the motive force for a swing, cradle or other toy or juvenile furniture item.

Yet another object is to provide a unit of this type which is relatively inexpensive to make, requires a minimum amount of maintenance and which should have a relatively long service life.

Other objects will in part by obvious and will in part appear hereinafter.

Briefly, the present swing comprises a foldable frame from which a seat is swingably suspended by means of hangers pivotally connected to opposite sides of the frame. A battery operated motor unit is removably mounted on the frame adjacent one of the hangers. The unit includes a small DC electric motor connected by way of a switch to a single small rechargeable battery in the motor unit. The motor unit also has accessible plug-in electrical contacts connected to the battery at which connection may be made to an AC-to-DC converter to recharge the batteries when needed. The motor unit is arranged to drive the swing solely from its battery or it can be powered directly from the converter while the battery is being recharged, the selection being determined by the switch setting. However, it can be marketed as a battery operated-rechargeable unit—without the option of being recharged directly from the converter.

The electric motor component of the motor unit periodically rewinds a mechanical escapement in the motor unit by way of a step-down gear chain. The escapement includes the usual spring biased, toothed escapement or ratchet wheel which is engaged by a spring-biased retaining pawl pivotally fixed in the motor unit housing and a driving pawl rotatively connected to a swing hanger above its pivot point to the swing frame. As the swing seat swings back and forth on its hangers, the two pawls co-act to release the ratchet wheel so that the wheel, being driven by its spring, imparts impulses to the driving pawl that serve to maintain the attached hanger and the swing seat as a whole in oscillation. In that general sense, then, the present motor unit is similar in operation to those used in electrically-driven pendulum clocks, for example.

The present motor unit differs from such prior mechanisms, however, in that the escapement has an unusually short stroke in that its ratchet wheel only rotates through part of one revolution (e.g. 180°) between windings. Resultantly, the spring used to drive the wheel is always near its fully wound condition so that a constant, maximum amount of torque is always available to impulse the swing hanger via the driving pawl so as to reinforce the oscillations of the swing seat sufficiently to sustain the swinging motion of the seat.

Since the escapement has a fraction-of-a-revolution unwind stroke, its ratchet wheel only has to be rewound through the same small angle by the electric motor during each rewind cycle. Consequently, the rewinding operation can be accomplished very quickly by a very small and very inexpensive DC motor powered by a single 1.25 volts d.c. battery. During each rewind cycle, means are provided in the mechanical escapement for disengaging the pawls from the toothed wheel. This not only eliminates drag on the wheel to further minimize the torque output requirement from the electric motor, it also eliminates the ratcheting or clicking noise that occurs each time the usual mechanical escapement is rewound. This feature is also highly desirable from a marketing standpoint.

The electric motor rewind drive is coupled to the mechanical escapement by way of a special gravity operated one-way clutch. The clutch operates to reliably engage and disengage the escapement from the driven gear train in such a way as to have minimum effect on the natural frequency of the swinging seat. Actually, the swing is designed so that the swinging seat itself disengages the clutch at a predetermined point in the swing cycle when the seat has a maximum amount of kinetic energy. Consequently, the seat is able to disengage the clutch in opposition to the bias of the escapement spring even though the swing may not be on level ground.

All of the aforesaid structural features coact to give the present swing a substantially constant swing period which can be maintained on a single battery charge for a prolonged period, on the order of 4 to 5 hours, before the battery has to be recharged. Furthermore, the swing can accommodate children whose weights may vary from 25 lbs. on down, and it can even be operated empty for demonstration purposes. The aforesaid construction also allows the swing to tolerate sudden shifts of weight as the child-occupant squirms about in the seat and indeed the swing will even operate when out of plumb. All of these features should enhance the marketability of the electric swing and make it a very useful item of juvenile furniture.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
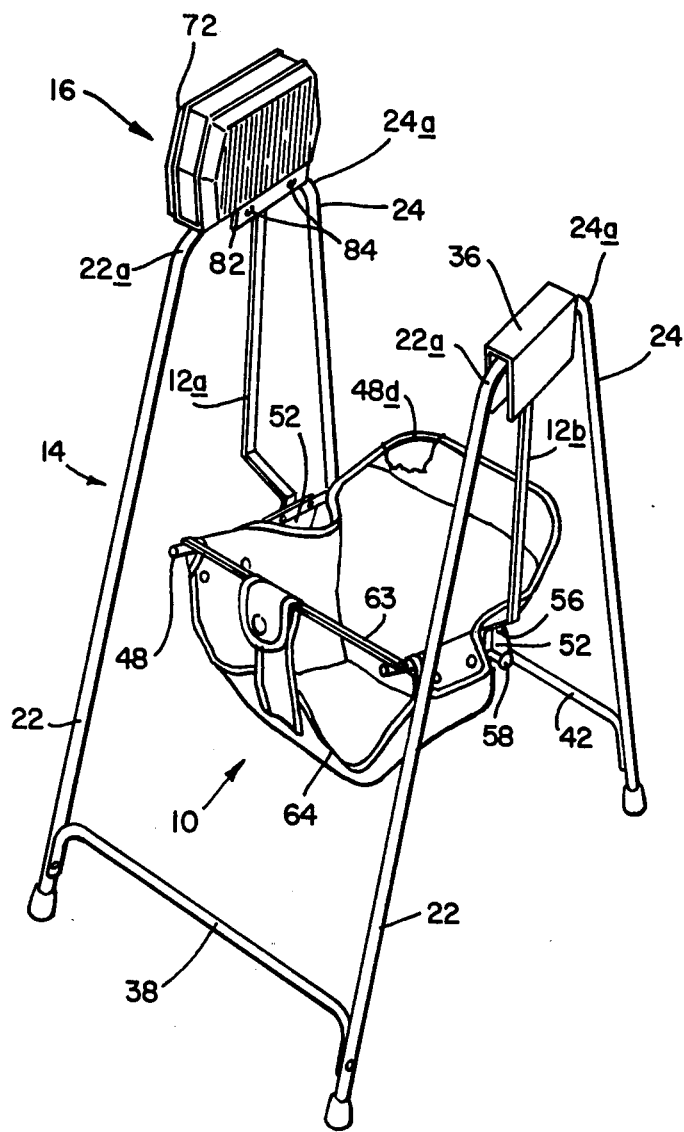
FIG. 1 is an isometric view of an electric swing embodying the principles of this invention.
Figure 2:
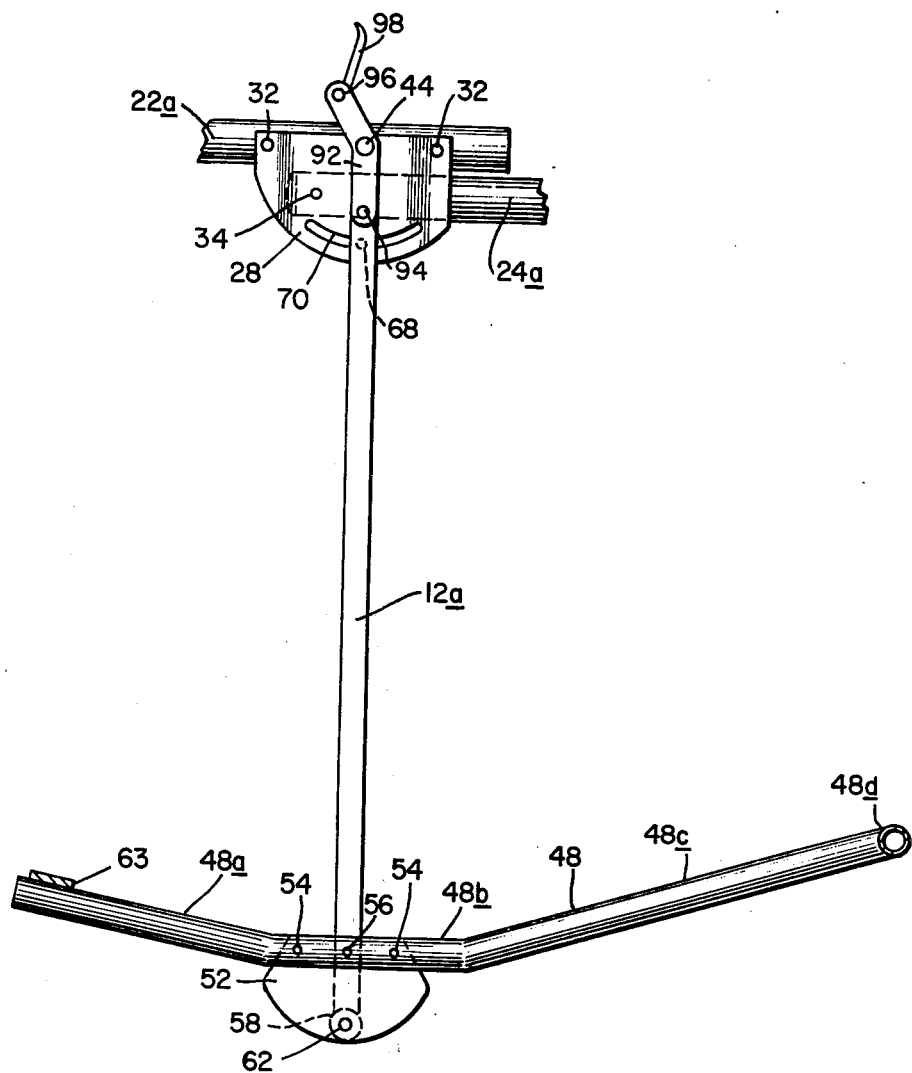
FIG. 2 is a fragmentary elevational view on a larger scale showing a portion of the FIG. 1 swing.

Turning now to FIGS. 1 and 2 of the drawings, my electric swing includes a seat indicated generally at 10 which is supported above the ground by a pair of laterally spaced-apart hangers 12a and 12b suspended from an upstanding, foldable frame assembly shown generally at 14. A motor unit indicated generally at 16 supported on frame 14 above hanger 12a imparts reinforcing impulses to hanger 12a so as to maintain the hanger and the seat 10 as a whole in oscillation at a natural frequency determined primarily by the length of hangers 12a and 12b and the mass of seat 10 and its contents.

Frame assembly 14 comprises a pair of identical spaced-apart front frame members 22 whose upper ends 22a are bent rearwardly and a pair of spaced-apart rear frame members 24 whose upper ends 24a are bent forwardly so as to underlie the forward frame member ends 22a. Refer now particularly to FIG. 2 which illustrates a portion of the frame assembly at the right side of the swing, i.e. under motor unit 16. The two frame member ends 22a and 24a are pivotally connected together by a plate 28 positioned against the insides of the frame members. The upper edge of plate 28 is secured to frame member end 22a by a pair of rivets 32. Frame member end 24a on the other hand is connected to the plate by a single pivot pin 34. An identical plate 28 (not shown) is located on the outsides of the frame member ends and similarly connected to those ends by the same rivets.

The frame members 22 and 24 at the opposite or left side of the swing are hinged together in exactly the same way. Accordingly, that hinge structure is not specifically illustrated in FIG. 1. Rather, a cover 36 is shown engaged over same to conceal that structure and protect the child's fingers from a potential pinch point.

Forward frame members 22 are connected together at their lower ends by a generally U-shaped transverse frame member 38 whose turned down ends are riveted to the lower ends of frame members 22. A similar transverse frame member 42 is similarly secured between the lower ends of the rear frame members 24. Thus the forward and rear frame members can be pivoted relative to one another about the pivots 34 between a spread-apart position illustrated in FIG. 1 wherein they form a stable support for seat 10 to a folded position (not shown) wherein the frame members 22 and 24 lie close together to permit the swing to be stored in a minimum amount of space.

As mentioned previously, the hangers 12a and 12b are pivotally connected at their upper ends to the frame assembly 14. More particularly, and referring to FIG. 2, the upper end of hanger 12a is connected to assembly 14 by a pivot pin 44 extending through plates 28 and the intervening frame member end 22a. A similar pivotal connection is made between the upper end of hanger 12b and the plates 28 and intervening frame member end 22a underlying cover 36 at the opposite side of the swing.

Still referring to FIGS. 1 and 2, seat 10 supported at the lower ends of hangers 12a and 12b comprises a generally U-shaped frame member 48. The opposite arms of member 48 have upwardly angled forward ends 48a, generally horizontal mid-sections 48b and relatively long, upwardly angled rear sections 48c whose ends are connected together by the transverse bight 48d of the frame member. A plate 52 is secured by rivets 54 to the frame member section 48b at each side of that member and the hangers 12a and 12b are pivotally connected near their lower ends to the corresponding plate 52 and member section 48b by pivot pins 56. Secured at the lower ends of each hanger 12a and 12b is a spring-loaded pull button 58 which is engageable in an opening 62 in the adjacent plate 52. When the swing is folded for storage, the buttons may be pulled out of their openings 62 so that the seat 10 can be tilted to a more vertical orientation to make the overall swing package more compact.

A rigid strap 63 extends between the free ends of the frame member sections 48a at the front of frame member 48 and the usual fabric bag-type seat structure 64 is removably engaged over and suspended from the frame member 48 and strap 63 as shown in FIG. 1. Thus the seat 10 is swingable back and forth relative to frame assembly 14 about the hanger pivots 44. To limit the excursions of the seat, outwardly extending pins or lugs 68 are secured to hangers 12a and 12b near their upper ends which project into arcuate openings 70 in plates 28, the magnitude of the excursions being limited by the length of the openings 70 shown best in FIG. 2.

Figure 3:
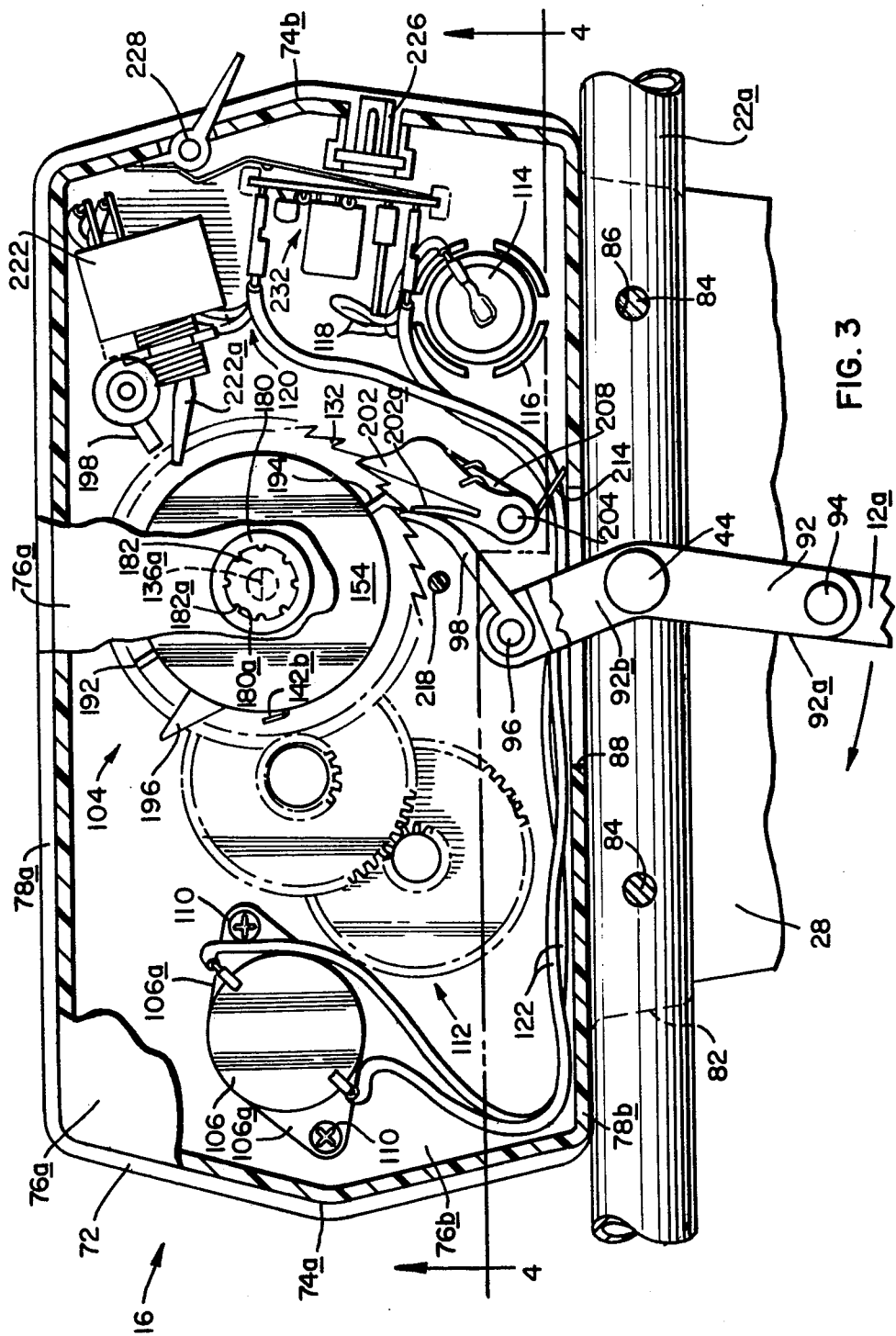
FIG. 3 is a sectional view on a still larger scale illustrating the motor unit of the FIG. 1 swing.
Figure 4:
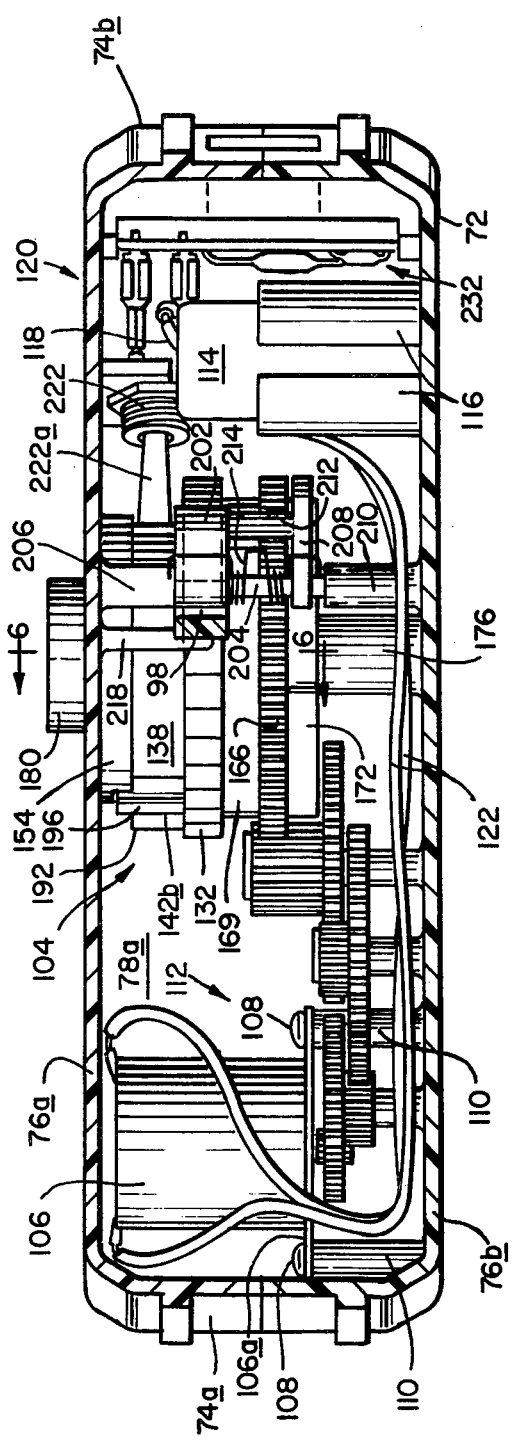
FIG. 4 is a sectional view along line 4—4 of FIG. 3.

Referring now to FIGS. 3 and 4, motor unit 16 comprises a generally rectangular housing 72 made of a suitable impact resistant plastic. The housing includes a front wall 74a, a rear wall 74b, a pair of side walls 76a and 76b and top and bottom walls 78a and 78b respectively. Depending from the bottom wall 78b are a pair of spaced-apart elongated tabs 82. These tabs are arranged to extend down on opposite sides of the upper end portion 22a of the front frame member 22 so as to conceal the hanger 12a connection there. Motor unit 16 is removably secured to that frame member end portion by bolts 84 extending through front and rear pairs of in-line openings 86 in tabs 82 and through registering openings (not shown) in the frame member end 22a.

Also an elongated opening 88 is formed in housing bottom wall 78b between tabs 82 for receiving a hanger extension 92 secured to the upper end of hanger 12a. Extension 92 includes a lower section 92a which is aligned with hanger 12a and connected to the hanger by a rivet 94 and by the pivot pin 44 so that it swings with hanger 12a. The upper section 92b of extension 92 extends forwardly at an obtuse angle. Pivotally secured at the upper end of section 92b by a pivot pin 96 is a driving pawl 98.

Still referring to FIGS. 3 and 4, pawl 98 forms part of a spring-wound mechanical escapement shown generally at 104 positioned inside housing 72 and which will be described in detail later. Also located in housing 72 is a small inexpensive DC electric motor 106 that draws about 700 ma of current. Motor 106 is provided with a pair of laterally extending ears 106a which are secured by screws 108 to a pair of spaced-apart posts 110 projecting out from housing wall 76b. Motor 106, coupled to the mechanical escapement 104 by way of a speed-reducing gear chain indicated generally at 112, periodically rewinds the escapement as will be described later. Motor 106 is powered by a single rechargeable sub C battery 114 having a nominal voltage of about 1.25 volts at about 300 ma of current. The battery is retained within a split sleeve 116 projecting out from housing side wall 76b. The battery is electrically connected by electrical leads 118 to a dual-charging switching circuit shown generally at 120 which is, in turn, connected by electrical leads 122 to motor 106.

Figure 6:
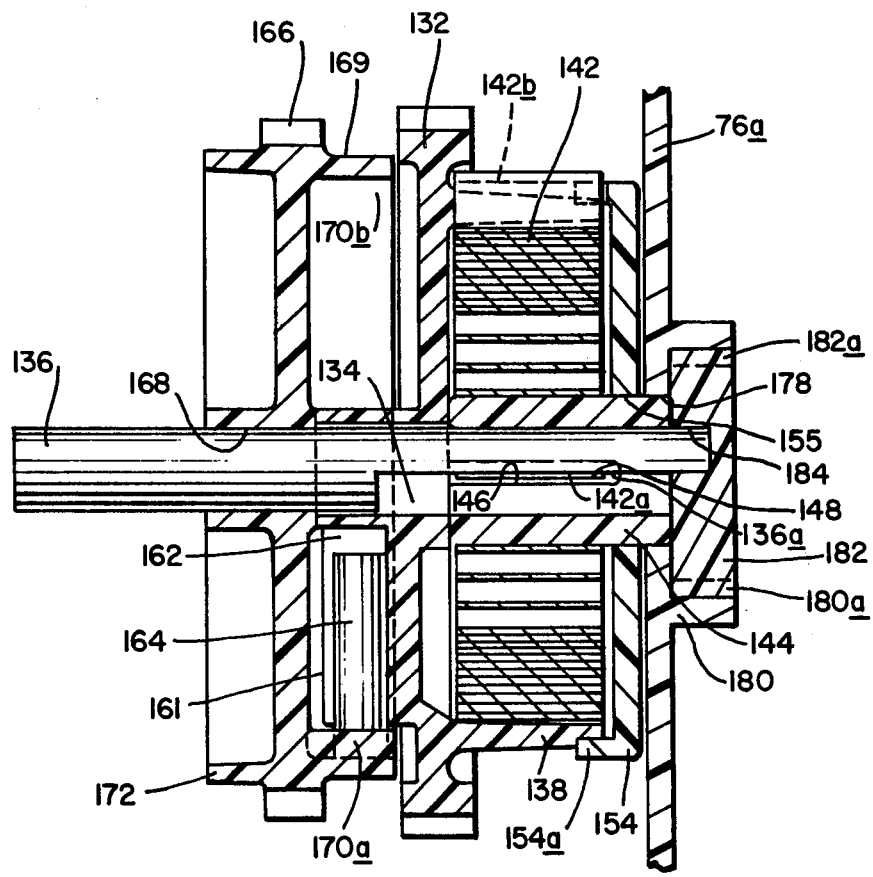
FIG. 6 is a sectional view along line 6—6 of FIG. 4 with certain parts shown in elevation.
Figure 7A:
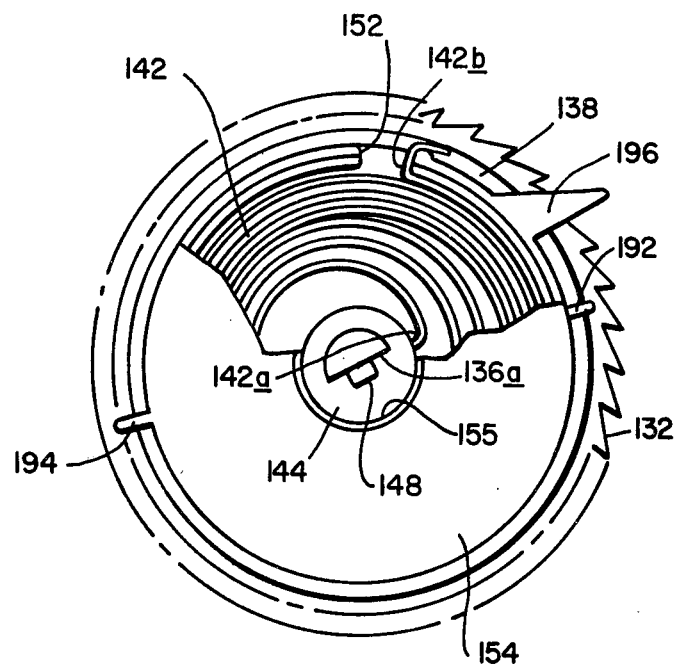
FIG. 7A is an elevational view with parts broken away showing a portion of the motor unit in still greater detail.

Referring now to FIGS. 4, 6 and 7A of the drawings, the mechanical escapement 104 includes a ratchet wheel 132 having an axial passage 134 that is rotatively received on a shaft 136. Projecting out from one face of ratchet wheel 132 is a circular skirt 138 that contains a coil spring 142. The spring is wound about a sleeve 144 slideably engaged over shaft 136 which is formed with a flat 136a where it extends through sleeve 144. The inner end 142a of spring 142 extends through a slot 146 in sleeve 144 and is retained there by a key 148. Thus the shaft 136, the spring end 142a and sleeve 144 are fixed together. The outer end 142b of the spring extends through a slot 152 and hooks around a wall of that slot as best seen in FIG. 7A. The free end of skirt 138 is closed by a cover 154 having an axial opening 155 that loosely receives sleeve 144. The cover has a circumferential flange 154a that engages around the end of the sleeve 138 thereby protectively enclosing the spring 142 between the cover and the ratchet wheel. The rim of flange 154a is permanently secured to collar 138 by a circumferential weld so that the cover and ratchet wheel rotate in unison. Also the flange 154a is slotted as shown in FIG. 6 to accommodate the spring outer end 142b that projects through skirt 138.

Figure 7B:
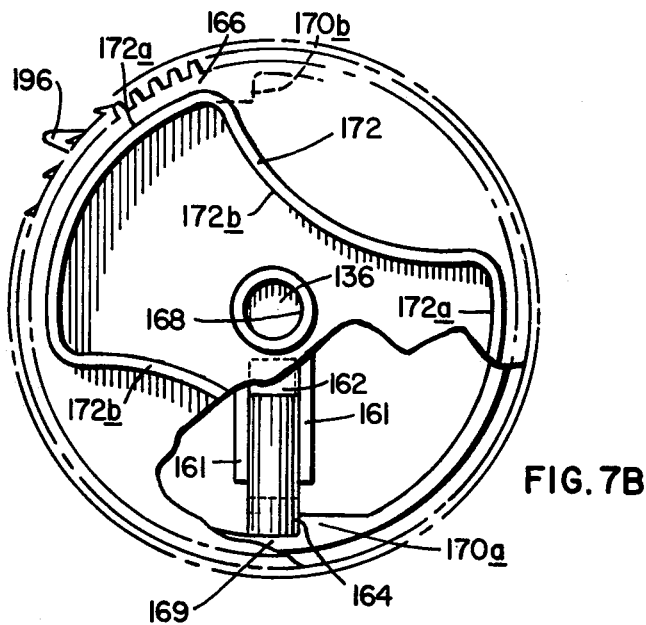
FIG. 7B is a view similar to FIG. 7A illustrating the clutch used in the FIG. 4 motor unit.

As best seen in FIGS. 6 and 7B, the opposite face of ratchet wheel 132 is formed with a pair of outwardly projecting, spaced-apart ribs 161 which are oriented radially on the ratchet wheel so that they define a slide 162 for a generally cylindrical clutch pin 164. When slide 162 is pointed downward at a sufficient angle, pin 164 drops down to an extended position shown in solid lines in FIG. 7B. Otherwise the pin rests in a retracted position in the slide.

Referring now to FIGS. 4, 6 and 7B, a cam gear 166 having an axial opening 168 for rotatively receiving shaft 136 is positioned opposite the side of ratchet wheel 132 supporting clutch pin 164. The cam gear is positioned to be rotated by the motor driven gear chain 112 to rewind the escapement. Cam gear 166 has a circular skirt 169 which projects toward the ratchet wheel. Formed on the inside wall of skirt 169 are a pair of diametrically opposite stops or noses 170a and 170b. These noses coact, one at a time, with the pin 164 to provide a gravity-operated one way clutch between wheel 132 and gear 166 as will be described later.

Projecting out from the opposite face of cam gear 166 is a laterally extending cam surface 172 whose function will become apparent later. Suffice to say at this point that the cam surface 172 has a pair of diametrically opposite convex sectors 172a connected by a pair of slightly longer diametrically opposite concave sectors 172b disposed symmetrically about the shaft opening 168 as best shown in FIG. 7B.

Referring now to FIGS. 3, 4 and 6, the escapement 104 is positioned more or less in the middle of housing 76 with the end of shaft 136 protruding from cam gear 166 being rotatively received in a sleeve 176 projecting in from housing sidewall 76b. On the other hand, the portions of the shaft 136 and encircling sleeve 144 protruding from cover 154 on the opposite side of the escapement project relatively loosely through an opening 178 in the housing sidewall 76a. The dimensions of the various parts are such that the end of sleeve 144 is more or less flush with the outside surface of sidewall 76a with the shaft 136 projecting somewhat beyond that sidewall. Surrounding opening 178 is a laterally extending circular collar 180 whose inner surface 180a is serrated. A circular disk 182 having a semicircular central opening 184 for receiving the flat projecting end 136a of shaft 136 is arranged to be seated inside collar 180. The periphery 182a of the disk is also serrated to interfit with collar surface 180a and prevent relative rotation between shaft 136 and housing 76 during normal use of the swing.

As best seen in FIGS. 3 and 7A, a pair of radially extending ribs 192 and 194 project radially at approximately diametrically opposite locations on the skirt 138 on ratchet wheel 132. These ribs cooperate with the switching circuit 120 to turn the motor 106 on and off at the beginning and end of each rewind cycle as will be described later. Also formed integrally in the cam skirt 138 is a radially outwardly projecting finger 196. Finger 196 is displaced angularly relative to rib 192 approximately 21° in the counter-clockwise direction as viewed in FIG. 3 and the finger projects appreciably out beyond the periphery of the ratchet wheel 132. As shown in FIG. 3, finger 196 is arranged to engage a stop 198 projecting out from the housing sidewall 76b adjacent wheel 132 near the top of the housing and prevents the ratchet wheel 132 from snapping around and damaging the pawls in the event someone inadvertently disengages both pawls from the wheel by hand. In other words, the finger 196 and stop 198 coact to limit the amount of rotation of the ratchet wheel 132 in the unwind, (i.e. clockwise) direction as viewed in FIG. 3.

Figure 5:
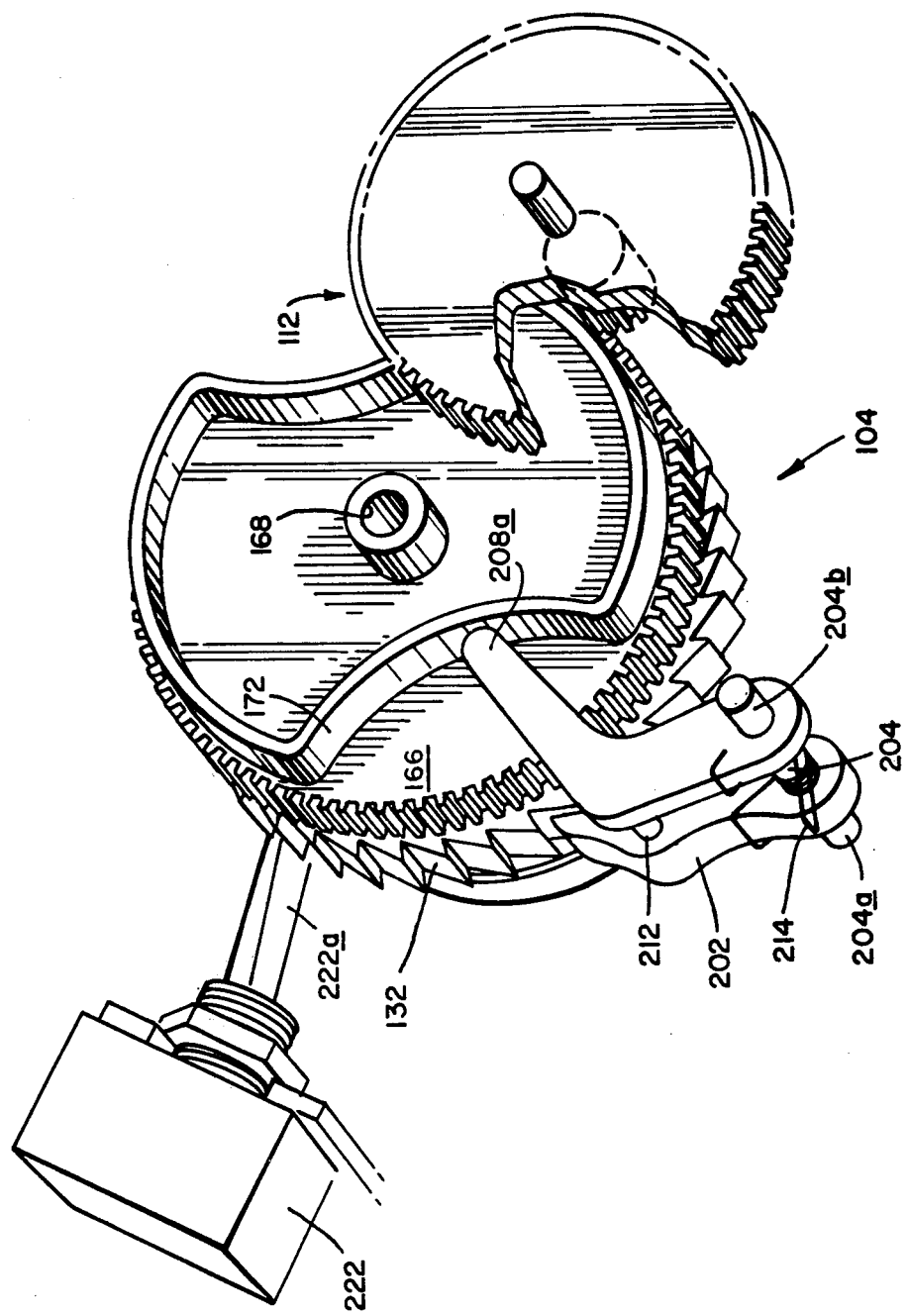
FIG. 5 is a fragmentary isometric view from below on a larger scale with parts cut away showing a portion of the FIG. 3 motor unit in greater detail.

Turning now to FIGS. 3–5, the driving pawl 98 pivotally connected at 96 to hanger extension 92 engages the teeth of the ratchet wheel 132. Positioned adjacent pawl 98 is a retainer pawl 202 having an integral axle 204. One end 204a of the axle projects out slightly beyond pawl 202 and is rotatively supported in a sleeve 206 (FIG. 4) extending out from the housing sidewall 76a. Axle 204 also projects out appreciably from the opposite side of pawl 202 and formed integrally with that section of the axle is a cam follower 208 whose projecting end 208a engages cam surface 172. The axle 204 has an end 204b (FIG. 5) which protrudes slightly beyond the cam follower 208 and is rotatively received in a sleeve 210 extending out from the housing sidewall 76b directly opposite the sleeve 206. An integral reinforcing rod 212 extends between the pawl 202 and the cam follower 208 to rigidify those members and to ensure that they move in unison.

As best seen in FIGS. 3 and 5, a spring 214 is coiled around axle 204 and reacts between pawl 202 and cam follower 208, on the one hand, and the housing bottom wall 76b, on the other hand, so as to bias the retainer pawl 202 toward the teeth of ratchet wheel 132. Furthermore, the retainer pawl has an integral resilient finger 202a which projects out from its base and bears against the driving pawl 98 so as to bias the driving pawl toward the ratchet wheel 132.

Referring now to FIGS. 3, 5 and 7A, when the hanger 12a swings forwardly or in the direction of the arrow in FIG. 3, the driving pawl 98 backs up the ratchet wheel 132 slightly and bears against the finger 202a of the retainer pawl 202 thereby disengaging the retainer pawl from the ratchet wheel. This permits the ratchet wheel 132 to be rotated by spring 142 in a clockwise direction as viewed in FIG. 3 so that it drives pawl 98 downwardly and forwardly so as to swing hanger 12a rearwardly in the direction opposite the arrow in FIG. 3. That movement of the driving pawl 98 away from the pawl finger 202a permits the retainer pawl to reengage the ratchet wheel 132 at the next tooth position, thereby stopping further rotation of the ratchet wheel. As the hanger 12a continues to swing rearwardly, the driving pawl 98 is advanced to the next tooth in the ratchet wheel. Whereupon the hanger 12a commences to swing forwardly in the direction of the arrow in FIG. 3 again disengaging the retainer pawl 202 permitting further incremental clockwise rotation of the ratchet wheel, and so on.

This process continues with the ratchet wheel imparting impulses through the driving pawl to the hanger to maintain the hanger and the swing seat 10 suspended therefrom in oscillation at the natural frequency of the seat as determined by the length of the hangers 12a and 12b and the mass of the seat 10 and its contents. As best shown in FIGS. 3 and 4, a post 218 projects out from the housing sidewall 76a on the opposite side of pawl 98 from the retainer pawl 202. The post prevents any possibility of the driving pawl 98 being carried around by the ratchet wheel in the event that the hanger 12a is moved to an extreme rearward position and retainer pawl 202 is disengaged from the wheel for one reason or another. Also, it should be understood at this point that the pawls 98 and 202 only engage the ratchet wheel 132 when the cam follower 208 contacts a concave segment 172b of the cam surface 172 best seen in FIG. 5. This occurs only when the escapement is actually driving the swing during an unwind cycle of escapement 104.

Still referring to FIGS. 3 and 4, the switching circuit 120 comprises a two position switch 222 for starting and stopping motor 106 at the beginning and end of each rewind cycle. Switch 222 is supported within the housing 76 so that its arm 222a projects toward skirt 138 on ratchet wheel 132. The arm is arranged so that it can be engaged by the ribs 192 and 194 projecting out from that skirt when wheel 132 is rotated. Thus as the ratchet wheel rotates clockwise (FIG. 3) approximately 180° as the escapement winds down during an unwind cycle, the rib 192 engages the switch arm 222a driving it downward thereby closing switch 222 and effecting an electrical connection between battery 114 and motor 106 to initiate a rewind cycle. On the other hand, after the ratchet wheel is rotated counterclockwise (FIG. 3) approximately 180° during the rewind cycle, the rib 194 eventually engages the switch arm 222a driving it upward, thereby opening the switch and interrupting the current flow to the motor thereby terminating the rewinding cycle.

Switching circuit 120 also includes a plug 226 mounted in the rear housing wall 74b to which connection may be made to a suitable DC source (not shown) for recharging battery 114. Also a second, two-position switch 228 is mounted in the rear wall 74b to permit two modes of recharging the battery 114. When switch 228 is in its CHARGE position, the plug 226 is electrically connected only to battery 114 to charge the battery while the swing remains inactive. In the other, i.e. CHARGE and RUN, position of switch 228, electrical connection to the plug 226 will apply a charging voltage to battery 114 while simultaneously powering motor 106 by way of switch 222 so that the swing will operate while the battery is being recharged.

Since the particular motor 106 draws 700 ma of current which is too much current to apply to battery 114 without eventual damage, a printed circuit board 232 including a current limiter is connected in circuit with the battery 114, switch 222, motor 106 and plug 226 to limit the current through the battery 114 to 300 milliamps when plug 226 is connected to a DC source. Circuit board 232 is of conventional construction and will not be detailed here and the required electrical connections between the motor, battery, switches and printed circuitboard to produce the desired operation as described above are obvious to those skilled in the art.

Referring now to FIGS. 3, 6, and 7A, the spring 142 in escapement 104 is prewound at the factory. This is accomplished by removing the serrated disk 182 from collar 180. Then the projecting end 136a of shaft 136 is engaged by a suitable key (not shown) and wound in the clockwise direction as viewed in FIG. 7A approximately 2½ turns to preload the escapement following which the disk is replaced. The escapement is prevented from unwinding by the engagement of pawl 202 with ratchet wheel 132.

During normal operation of the swing, the plug 226 is connected to a suitable 1.5 volt DC source to charge battery 114. This can be accomplished while the swing is inoperative by placing the switch 228 in its CHARGE position. Alternatively the switch 228 may be positioned in its CHARGE AND RUN position in which case the swing can be operated while the battery is being recharged. For purposes of this discussion, we will assume that battery 114 is fully charged. Also we will assume that escapement 104 has just started operating in its unwind mode so that it is imparting reinforcing impulses to the swing hanger 12a by way of pawl 98 so that the swing seat 10 is already swinging back and forth. In this mode, the prewound spring 142 provides about 5 to 7 inch pounds of torque which remains substantially constant throughout the approximately 180° rotation to the ratchet wheel. As the seat continues to swing, the ratchet wheel 132 continues to turn in a clockwise direction as viewed in FIG. 3 for about 20 to 25 seconds (corresponding to about 14 to 16 swings of seat 10) until the rib 192 engages the switch arm 222a. A further slight rotation of the ratchet wheel drives the switch arm downward thereby electrically connecting battery 114 and motor 106.

As best seen in FIG. 7B, the positions of the rib 192 and slide 162 on ratchet wheel 132 are such that when the slide extends down vertically as shown in that figure, the rib 192 is located approximately 21° above the horizontal. As shown in FIG. 3, that is the precise position of the switch arm 222a relative to the axis of the escapement 104. Consequently, when the rib 192 trips switch 222 to turn on motor 106, the clutch pin 164 has already dropped down under gravity into position to be engaged the nose 170a on the cam gear 166. Consequently, rotation of the cam gear by the motor causes the nose 170a to engage the clutch pin so that the ratchet wheel is rotated along with the cam gear in a clockwise direction as viewed in FIG. 7B (counterclockwise in FIG. 3). This rotation continues until the rib 194 on wheel 132 is rotated into position to push the switch arm 222a upwards thereby deenergizing motor 106 and terminating the rewind cycle.

Since the two ribs 192 and 194 are 180° apart, the ratchet wheel and cam gear are rotated only one-half a revolution so that at the end of the rewind cycle, the slide 162 is pointed vertically upward and the nose 170b (FIG. 7B) is pointed downward, i.e. in the position occupied by ramp 170a in FIG. 7B. Thus at that point, nose 170b is in position to engage the clutch pin 164 at the beginning of the next rewind cycle after the escapement 104 has again wound down to the point where the ratchet wheel 132 has again rotated 180° to return the slide 162 to its downward disposition illustrated in FIG. 7B.

Referring now to FIGS. 5 and 7B, the cam surface 172 is oriented on the cam gear so that the boundaries between its convex and concave sectors 172a and 172b respectively are located precisely at the same angular positions as the noses 170a and 170b. Furthermore, at the beginning of each rewind cycle when slide 162 is pointed down, the cam follower 208 is angularly positioned relative to the cam surface so that its end 208a engages near the beginning of a convex sector thereof. Consequently, as soon as the cam gear begins to rotate, the cam follower 208 is pivoted about its axle 204 and swings the retainer pawl 202 away from the ratchet wheel. Accordingly, its resilient finger 202a no longer biases the driving pawl 98 against the ratchet wheel so that pawl 98 also drops away from the ratchet wheel under its own weight. Thus while the cam gear and wheel are rotated 180° during each rewind cycle neither pawl engages the ratchet wheel. Consequently they exert no drag on the wheel and produce no ratcheting or clicking noise by riding up and over the wheel teeth. After the cam gear has rotated 180°, a concave sector 172b of the cam surface has rotated opposite the cam follower 208 so that the spring-biased retainer pawl 202, as well as the driving pawl 98, are gradually swung back into engagement with the ratchet wheel.

Referring now to FIGS. 2, 3 and 7B, at the end of the rewind cycle at the instant the motor 106 is turned off, the upwardly disposed clutch pin 164 is still tightly engaged by a nose 170a on 170b because of the bias provided by the main spring 142. In order to permit pin 164 to retract under gravity into slide 162 to disengage wheel 132 from cam gear 166 and permit the escapement to operate, the ratchet wheel must first be backed up slightly (i.e. counterclockwise in FIG. 3) in opposition to the spring bias. To ensure that the clutch does disengage reliably at the proper time, the swing is designed so that when it is in a normal static load condition, the escapement 104 is under reverse tension. In other words, when the swing is turned off and the swing seat 10 is stationary, the driving pawl 98 is in engagement with a tooth of ratchet wheel 132 and the ratchet wheel is backed up slightly in the counterclockwise direction as viewed in FIG. 3 (and the retainer pawl 202 is between teeth). Thus if the clutch pin 164 and a nose 170a or 170b are at the top of the escapement they are out of engagement and the clutch pin is retracted into the slide. This normal tensioned condition of the escapement is achieved by appropriately positioning and dimensioning the driving pawl so that when the seat 10 is at rest, the driving pawl applies a reverse torque to the ratchet wheel to offset the bias of the main spring.

Furthermore, to assure that the back-up torque is always available even when the seat is empty, the seat 10 is designed with a substantial recline relative to its hangers 12a and 12b. In addition, the bracket 92 (FIG. 3) is shaped and positioned so that when the swing seat is in its static condition, the driving pawl 98 applies a force to the ratchet wheel which is substantially tangential to the wheel so that a maximum reverse torque is exerted on the wheel. Thus at the end of each rewind cycle just after motor 106 is turned off, the driving pawl 98 will engage the ratchet wheel tooth applying a tangential force thereto when the swing seat is in the lowest point in its excursion and has maximum kinetic energy. Consequently a maximum amount of force is transmitted to the ratchet wheel to exert the requisite amount of back-up torque on that member. By the same token, ratchet wheel 132 delivers impulses of maximum strength to hanger 12a during each unwind cycle of the escapement.

Because of the aforesaid construction of the escapement 104, the rewind operation takes place at precisely defined intervals. Even if the swing support 14 is tilted somewhat, the gravity operated one way clutch will assuredly engage before the motor 106 is turned on at the beginning of each rewind cycle and will assuredly disengage immediately after the motor is turned off at the end of that cycle when the swing seat 10 has maximum kinetic energy. Moreover, each rewinding operation takes place very quickly, i.e. in about 2 to 3 seconds (corresponding to about 2 to 3 swings of seat 10). Consequently, the number of unreinforced swing cycles during rewinding are kept to a minimum so that there is little likelihood of there being insufficient potential energy in the swing system to disengage the clutch or maintain the swing seat in oscillation.

The present swing will operate 4 to 5 hours on a single battery charge at a frequency of about 40 to 46 swing cycles per minute. The swing seat 10 is angled so that even if the weight of its occupant varies, the swing frequency will remain more or less the same. In other words, as the mass of the seat 10 and its contents increases, the center of mass of the seat and its contents shifts upwardly so as to shorten the effective pendulum arm of the swing. These two factors offset one another so that there is minimum net frequency change in the swing seat oscillation. In fact, as the seat contents varies from 0 to 25 lbs., there is only about a 2 swing per minute variation in the swing seat frequency. Also shifting movements of the occupant of the seat 10 seem to have little effect on the swing seat frequency.

Furthermore because of the construction of the motor unit 16 there is little danger of the unit becoming damaged if the swing seat is impeded or suddenly stopped in mid-cycle by its occupant or by a bystander. In that event, the spring driven ratchet wheel 132 being decoupled from the cam gear will simply follow the movements of the driving pawl 98 as the swing hanger 12a is moved in either direction or is stopped.

It will thus be seen that the objects set forth above among those made apparent from the preceding description are efficiently attained. Also certain changes may be made in the above construction without departing from the scope of the invention. For example, the motor unit 16, being a self-contained unit, can be utilized equally well to drive other toys or items of juvenile furniture having a natural frequency of vibration, e.g., a cradle. Therefore it is intended that all matter contained in the above description or shown in the accompanying drawings be interpreted as illustrative and not in a limiting sense.

It is also to be understood that the following claims are intended to cover all of the generic and specific features of the invention described.

I claim:

1. In a child's electric swing of the type including an elevated support, a seat, a pair of laterally spaced-apart hangers for swingably suspending the seat from the support and a motor unit connected to oscillate the seat relative to the support, the improvement wherein the motor unit includes:
   A. housing,
   B. a ratchet wheel,
   C. means for supporting the ratchet wheel for rotation about an axis in the housing,
   D. a retainer pawl rotatively supported within the housing,
   E. means for biasing the retainer pawl against the periphery of the ratchet wheel,
   F. a driving pawl pivotally connected to the hanger within the housing,
   G. means for biasing the driving pawl against the periphery of the ratchet wheel,
   H. a mainspring for biasing the ratchet wheel into rotative engagement with the pawls,
   I. means for winding the mainspring, said winding means including
      1. a DC motor,
      2. a gear train having a first gear engaging the motor and a last gear engageable with the ratchet wheel,
      3. a battery,
      4. means including a switch for electrically connecting the motor to the battery when the ratchet wheel attains a first angular orientation within the housing and for electrically disconnecting the motor from the battery when the ratchet wheel attains a second angular orientation within the housing, and
   J. means for engaging and disengaging said last gear from the ratchet wheel at approximately the same times that said motor is respectively connected to and disconnected from said battery.

2. The swing defined in claim 1 wherein the engaging and disengaging means includes means carried by said ratchet wheel and said last gear for cooperating to form a gravity-operated one way clutch which engages so as to couple torque from said last gear to said ratchet wheel at approximately the same time said switch connects said battery to said motor and which decouples said driving gear from said ratchet wheel at approximately the same time said switch disconnects said motor from said battery.

3. The swing defined in claim 2 wherein said clutch forming means comprises
   A. a slide formed in the face of the ratchet wheel,
   B. at least one stop formed in a face of said last gear which face is disposed opposite said slide, and
   C. weight means slideably mounted in said slide and movable between a first, radially outward position wherein it is engageable by said stop approximately when the ratchet wheel is in its said first orientation and a second, radial inward position wherein it is not engageable by said stop after said ratchet wheel has attained its said second angular orientation.

4. The swing defined in claim 3 wherein there are at least two of said stops positioned diametrically opposite one another on said last gear.

5. The swing defined in claim 1 and further including means for disengaging said pawls from said ratchet wheel while said ratchet wheel is rotated from its said first angular orientation to its said second angular orientation whereby to eliminate the ratcheting noise that would normally occur as said spring is being rewound by said winding means.

6. The swing defined in claim 5 wherein said disengaging means includes
   A. a cam which rotates with said last gear, and
   B. a cam follower rotatively mounted with said retainer pawl and having a portion thereof engaging said cam, said cam being profiled so that when said ratchet wheel is rotated from its first said orientation to its second said orientation said cam follower swings the retainer pawl out of engagement with said ratchet wheel and when said ratchet wheel is rotated from its said second orientation to its said first orientation said cam follower permits said retainer pawl to be return-biased into engagement with said ratchet wheel.

7. The swing defined in claim 1 wherein the included angle between said first and second angular orientations of the ratchet wheel does not exceed 360°.

8. The swing defined in claim 7 wherein the included angle is approximately 180°.

9. The swing defined in claim 1 and further including means facilitating prewinding said spring so that said ratchet wheel is biased against a pawl with an appreciable amount of force when said ratchet wheel is at its said first angular orientation.

10. The swing defined in claim 9 wherein said spring is prewound through a plurality of turns when said ratchet wheel is at its said first angular orientation.

11. The swing defined in claim 1 and further including means including a plug mounted in said housing for electrically connecting said battery to a remote source of direct current.

12. The swing defined in claim 11 wherein said connecting means includes a two position switch in one of whose positions said plug is connected to said battery when said swing is not in operation and in the other of whose positions said plug is connected to said battery and said motor when said swing is in operation.

13. The swing defined in claim 1 wherein said seat is swingably supported by said hangers so that when the seat is in its lowestmost position in the swing cycle the driving pawl is tooth-drivingly engaged by the ratchet wheel so that said mainspring exerts a torque on said pawl-connected hanger.

14. In a child's electric swing of the type including an elevated support, a seat, a pair of laterally spaced-apart hangers for swingably suspending the seat from the support and a motor unit connected to oscillate the seat relative to the support, the improvement wherein said motor unit comprises:
   A. a housing mounted on said support,
   B. a spring motor including a mechanical escapement mounted in said housing, said escapement including
      1. a ratchet wheel,
      2. a retainer pawl pivotally mounted in the housing for engagement with the teeth of the ratchet wheel,
      3. a driving pawl pivotally connected to a hanger and engageable with the teeth of said ratchet wheel,
      4. means for biasing the pawls against the ratchet wheel, and
      5. a mainspring for biasing the ratchet wheel into tooth-driving engagement with the pawls,
   C. means in the housing for winding the spring motor, said winding means comprising
      1. a DC electric motor,
      2. a battery, and
      3. means for selectively connecting the motor to the battery at the beginning of each winding cycle and for disconnecting the motor from the battery at the end of each winding cycle, and
   D. means for disengaging said pawls from said ratchet wheel during each said winding cycle so that there is no ratcheting noise produced by pawls riding up and over the teeth of the ratchet wheel during said winding cycle.

15. The swing defined in claim 14 wherein the disengaging means comprises
   A. a cam which rotates with the ratchet wheel during the winding cycle,
   B. a cam follower pivotally mounted in the housing adjacent the cam, and
   C. means for biasing the cam follower against the cam, said cam being profiled so that during said winding cycle the cam follower is moved to a first position wherein it causes the spring-biased pawls to disengage from the ratchet wheel and between said winding cycles the cam follower is moved to a second position wherein it causes the spring-biased pawls to engage said ratchet wheel.

16. In a motorized swing the improvement wherein the motor comprises
   A. a housing,
   B. a mechanical wind-up escapement-type spring motor mounted in the housing, said motor including
      1. a ratchet wheel,
      2. a retainer pawl,
      3. means for biasing the retainer pawl against the teeth of the ratchet wheel, and
      4. a mainspring for urging the ratchet wheel into toothed engagement with the pawl during the winding cycle of the motor,
   C. means for periodically rotating the ratchet wheel in the opposite direction to wind up said motor, said winding means including
      1. a battery,
      2. a DC electric motor,
      3. means including a clutch for coupling torque between said electric motor and said ratchet wheel only during each said winding cycle, and
      4. means including a switch for electrically connecting the electric motor to the battery at the beginning of each winding cycle and for disconnecting the electric motor from the battery at the end of each winding cycle.

17. The swing defined in claim 16 wherein
   A. said switch is mounted in the housing adjacent the ratchet wheel, and
   B. said connecting means further includes
      1. means rotating with the ratchet wheel for engaging the switch so as to close the switch when the ratchet wheel assumes a first angular orientation in the housing at the beginning of each winding cycle, and
      2. second means rotating with the ratchet wheel for engaging the switch so as to open the switch when the ratchet wheel assumes a second angular orientation in the housing at the end of each winding cycle.

18. The swing defined in claim 17 wherein the first and second engaging means comprise first and second projections formed on the ratchet wheel.

19. The swing defined in claim 16 wherein said ratchet wheel
   A. is rotated in one direction no more than one revolution during each winding cycle, and
   B. is rotated in the opposite direction no more than one revolution between said winding cycles.

20. The swing defined in claim 19 wherein said ratchet wheel is rotated approximately 180° during each winding cycle and approximately 180° between winding cycles.

21. The swing defined in claim 16 wherein said clutch is a gravity operated one way clutch.

22. The swing defined in claim 21 wherein said clutch comprises
   A. a slide formed in a face of the ratchet wheel, and
   B. a weight slideably positioned in the slide for movement between a radially extended position wherein it is engageable by the torque coupling means during each winding cycle to a radially retracted position wherein it is not engageable by the torque coupling means between winding cycles.

23. The swing defined in claim 16 wherein the duration of each winding cycle corresponds to less than 10 cycles of the oscillatory motion of the swing.

* * * * *